(12) United States Patent
Saigo (10) Patent No.: US 8,952,999 B2
(45) Date of Patent: Feb. 10, 2015

(54) IMAGE PROCESSING DEVICE, DISPLAY DEVICE, AND IMAGE PROCESSING METHOD

(75) Inventor: Manabu Saigo, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 272 days.

(21) Appl. No.: 13/541,240

(22) Filed: Jul. 3, 2012

(65) Prior Publication Data

US 2013/0021227 A1    Jan. 24, 2013

(30) Foreign Application Priority Data

Jul. 22, 2011   (JP) ................ 2011-160723

(51) Int. Cl.
  G09G 5/10      (2006.01)
  G09G 5/02      (2006.01)
  H04N 9/31      (2006.01)
  H04N 9/67      (2006.01)

(52) U.S. Cl.
  CPC ............... *G09G 5/02* (2013.01); *H04N 9/3108* (2013.01); *H04N 9/3182* (2013.01); *H04N 9/67* (2013.01); *G09G 2300/0452* (2013.01)
  USPC .......................................... 345/690; 345/694

(58) Field of Classification Search
  CPC .......... G09G 2300/0452; G09G 5/02
  USPC .................................. 345/55, 690
  See application file for complete search history.

(56) References Cited

U.S. PATENT DOCUMENTS

| | | | |
|---|---|---|---|
| 6,633,302 B1 | 10/2003 | Ohsawa et al. | |
| 7,944,423 B2 | 5/2011 | Kurumisawa | |
| 2004/0234163 A1* | 11/2004 | Lee et al. | 382/298 |

FOREIGN PATENT DOCUMENTS

| | | |
|---|---|---|
| JP | A-07-6703 | 1/1995 |
| JP | A-2000-338950 | 12/2000 |
| JP | A-2006-267541 | 10/2006 |

* cited by examiner

*Primary Examiner* — Abbas Abdulselam
*Assistant Examiner* — Sarvesh J Nadkarni
(74) *Attorney, Agent, or Firm* — Oliff PLC (57) ABSTRACT

An image processing device supplies an image signal to a display device having pixels being composed mainly of four sub-pixels arranged two by two in a first direction and a second direction. The image processing device includes a first filter processing section adapted to perform a filter process of limiting frequency bands in the first direction and the second direction of the image signal adapted to display a first sub-pixel corresponding to white in a manner corresponding to an arrangement of both of the first sub-pixel and a second sub-pixel located in a diagonal direction with respect to the first sub-pixel, and a second filter processing section adapted to perform a filter process of limiting frequency bands in the first direction and the second direction of the image signal adapted to display the second sub-pixel in a manner corresponding to an arrangement of the first sub-pixel and the second sub-pixel.

9 Claims, 6 Drawing Sheets

IMAGE PROCESSING DEVICE, DISPLAY DEVICE, AND IMAGE PROCESSING METHOD

BACKGROUND

1. Technical Field

The present invention relates to image processing performed in the case of performing color display using four colors of sub-pixels.

2. Related Art

As an arrangement of the pixels in a display device using three primary colors, there can be cited a stripe arrangement and a delta arrangement (see, e.g., JP-A-07-006703 (Document 1)). In such a display device, each pixel is composed of three sub-pixels. Further, in a Bayer arrangement, each pixel is composed of four sub-pixels although the number of colors is three, two sub-pixels are assigned to green (G), one sub-pixel is assigned to each of red (R) and blue (B), and these sub-pixels are arranged two by two in the vertical and horizontal directions.

In the display device having the pixels configured using the Bayer arrangement, the color display is generally performed using the image data with quarter as many pixels as the pixels of the image data input therein. In this case, since the resolution of the image data used actually becomes lower than the resolution of the image data input therein, a filter process for limiting the frequency band of the image signal is performed to thereby suppress the moire caused by the alias. For example, in the case of the R and B image signals, in order for preventing the moire caused by the high-frequency component, it is necessary to limit the frequency band of both of the vertical and lateral directions to a half (i.e., ½) thereof. It should be noted that since the G image signal has twice as many sub-pixels as the R or B image signal, the limitation range of the band can be smaller than these.

Incidentally, there is a case in which the color display is performed using four primary colors (or more primary colors) for the purpose of improvement of color reproducibility or brightness. For example, JP-A-2006-267541 (Document 2) discloses the image display device having either one of the G sub-pixels in the Bayer arrangement replaced with white (W) or cyan (C) sub-pixel to thereby perform the color display with four colors of sub-pixels. Further, JP-A-2000-338950 (Document 3) discloses a technology for calculating the color image signals of the respective colors in the case of having a color display section of four or more primary colors. It should be noted that the "primary color" mentioned here denotes the color forming a base of the color mixture (an additive process), and is not limited to the light's three primary colors.

In the case of performing the color display with the four colors of sub-pixels, if the band of the image signal is limited for each of the colors independently from each other, the image signal of either sub-pixel is limited to a half in the frequency band in both of the vertical and lateral directions. However, if such a band limitation is performed, the information lost from the original image increases.

SUMMARY

An advantage of the invention is to achieve improvement of the visual image quality using the color and position of sub-pixels corresponding to white color in the case of performing the color display using four colors of sub-pixels.

An aspect of the invention is directed to an image processing device adapted to supply an image signal to a display device having pixels arranged in a matrix, each of the pixels being composed mainly of four sub-pixels arranged two by two in a first direction and a second direction intersecting with the first direction, one of the sub-pixels constituting each of the pixels corresponding to white, including a first filter processing section adapted to perform a filter process of limiting frequency bands in the first direction and the second direction of the image signal adapted to display a first sub-pixel corresponding to white in a manner corresponding to an arrangement of the first sub-pixel and a second sub-pixel located in a diagonal direction with respect to the first sub-pixel, a second filter processing section adapted to perform a filter process of limiting frequency bands in the first direction and the second direction of the image signal adapted to display the second sub-pixel in a manner corresponding to an arrangement of the first sub-pixel and the second sub-pixel, a third filter processing section adapted to perform a filter process of limiting a frequency band in the second direction of the image signal adapted to display a third sub-pixel adjacent to the first sub-pixel in the first direction in a manner corresponding to an interval in the second direction of the third sub-pixels, and a fourth filter processing section adapted to perform a filter process of limiting a frequency band in the first direction of the image signal adapted to display a fourth sub-pixel adjacent to the first sub-pixel in the second direction in a manner corresponding to an interval in the first direction of the fourth sub-pixels.

According to this image processing device, the frequency band of the image signal is limited in accordance with the arrangement of the first sub-pixel corresponding to the white display and the other sub-pixels, and improvement in the visual image quality can be achieved.

In a preferred aspect of the invention, at least one of the third filter processing section and the fourth filter processing section allows the image signal, which is input, in a band other than a passband of the at least one of the third filter processing section and the fourth filter processing section, and included in a passband of the first filter processing section to pass with a phase of the image signal inverted.

According to this aspect of the invention, it is possible to suppress the moire and the false color caused by displaying the first sub-pixel.

In another preferred aspect of the invention, the image processing device has a frequency response in the band the image signal passes with the phase inverted which is determined in accordance with luminance of the first sub-pixel, the second sub-pixel, the third sub-pixel, and the fourth sub-pixel.

According to this aspect of the invention, the suppression of the moire and the false color can be performed in accordance with the characteristics of the sub-pixels.

In still another preferred aspect of the invention, the second filter processing section performs the filter process on the image signal corresponding to green, and the third filter processing section and the fourth filter processing section perform the filter processes on the image signals corresponding to red and blue, respectively.

According to this aspect of the invention, the resolution of the green image (with higher spectral sensitivity of the human eyes) can be enhanced to a level higher than those of red and blue.

Another aspect of the invention is directed to a display device including a display panel having a plurality of pixels arranged in a matrix, each of the pixels being mainly composed of the first sub-pixel, the second sub-pixel, the third sub-pixel, and the fourth sub-pixel, and the image processing device according to any one of the above aspects of the invention.

According to this display device, the frequency band of the image signal is limited in accordance with the arrangement of the first sub-pixel corresponding to the white display and the other sub-pixels, and improvement in the visual image quality can be achieved.

Still another aspect of the invention is directed to a method performed on an image signal supplied to a display device having pixels arranged in a matrix, each of the pixels being composed mainly of four sub-pixels arranged two by two in a first direction and a second direction intersecting with the first direction, one of the sub-pixels constituting each of the pixels corresponding to white. The method includes: limiting frequency bands in the first direction and the second direction of the image signal adapted to display a first sub-pixel corresponding to white in a manner corresponding to an arrangement of both of the first sub-pixel and a second sub-pixel located in a diagonal direction with respect to the first sub-pixel, limiting frequency bands in the first direction and the second direction of the image signal adapted to display the second sub-pixel in a manner corresponding to an arrangement of the first sub-pixel and the second sub-pixel, limiting a frequency band in the second direction of the image signal adapted to display a third sub-pixel adjacent to the first sub-pixel in the first direction in a manner corresponding to an interval in the second direction of the third sub-pixels, and limiting a frequency band in the first direction of the image signal adapted to display a fourth sub-pixel adjacent to the first sub-pixel in the second direction in a manner corresponding to an interval in the first direction of the fourth sub-pixels.

According to this image processing method, the frequency band of the image signal is limited in accordance with the arrangement of the first sub-pixel corresponding to the white display and the other sub-pixels, and improvement in the visual image quality can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
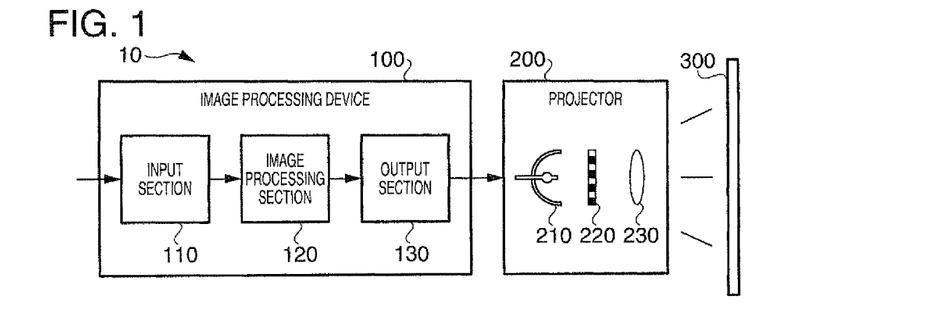
FIG. 1 is a block diagram showing a configuration of a display system.

FIG. 1 is a block diagram showing a configuration of a display system 10 according to an embodiment of the invention. The display system 10 shown in the drawing is provided with an image processing device 100, a projector 200, and a screen 300, and is for projecting an image, which corresponds to image data supplied from an external device, on the screen 300. The external device is, for example, a personal computer, and can also be a digital still camera or the like. It should be noted that the image data supplied by the external device is the data in which each pixel is expressed by image signals corresponding respectively to three color components of red (R), green (G), and blue (B).

The projector 200 is of a single panel type, and is provided with a light source 210, one liquid crystal panel 220, and a projection lens 230. The liquid crystal panel 220 functions as a light modulator for modulating the light input therein, and varies the transmission state of the light in a manner corresponding to the image data supplied from the image processing device 100 to thereby control the degree of transmission of the light emitted by the light source 210. The projection lens 230 projects the light transmitted through the liquid crystal panel 220 on the screen 300.

The liquid crystal panel 220 is a plate-like display panel in which each pixel is composed of four sub-pixels different from each other in transmission state of the light due to color filters or the like. The sub-pixels correspond to the display of four colors of red (R), green (G), blue (B), and white (W), respectively. The arrangement of the pixels of the liquid crystal panel 220 is obtained by replacing one of the two G sub-pixels in the Bayer arrangement with a W sub-pixel. It should be noted that white (a white color) mentioned here can be somewhat yellowish or grayish providing all of the color components of R, G, and B are included at appropriate proportions. It should be noted that assuming the luminance of the sub-pixels of R, G, B, and W as $Y_R$, $Y_G$, $Y_B$, and $Y_W$, respectively, it is ideal that the relationship of $Y_W = Y_R + Y_G + Y_B$ is fulfilled, and therefore, it is assumed in the present embodiment that such a relationship is fulfilled.

Figure 2:
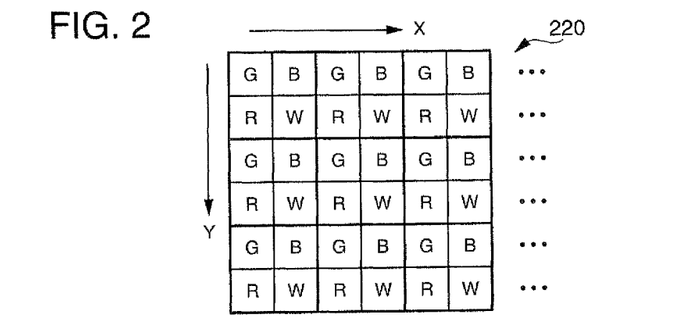
FIG. 2 is a diagram showing an arrangement of pixels of a liquid crystal panel.

FIG. 2 is a diagram showing the arrangement of the pixels of the liquid crystal panel 220. In the liquid crystal panel 220, the sub-pixels are arranged side by side in the X direction in the drawing and the Y direction perpendicular thereto, and each of the pixels is composed of two sub-pixels adjacent to each other in the X direction and two sub-pixels adjacent respectively to these two sub-pixels in the Y direction. In the liquid crystal panel 220, the sub-pixels corresponding to G and B are disposed in series in odd rows along the X direction, and the sub-pixels corresponding to R and W are disposed in series in even rows along the X direction. Further, in the liquid crystal panel 220, the sub-pixels corresponding to G and R are disposed in series in odd columns along the Y direction, and the sub-pixels corresponding to B and W are disposed in series in even columns along the Y direction. It should be noted here that the X direction corresponds to a first direction in the invention and the Y direction corresponds to a second direction in the invention.

Here, it is assumed that each of the sub-pixels has a square shape of the same size, and the intervals therebetween in the X direction and the Y direction are equal to each other. According to this arrangement, it results that the four sub-pixels constituting each of the pixels are arranged in a square manner. The liquid crystal panel 220 is composed of such pixels each having the square shape arranged in a matrix in the X direction and the Y direction. Here, the G sub-pixel is located in the diagonal direction viewed from the W sub-pixel, adjacent to the B sub-pixel in the X direction, and adjacent to the R sub-pixel in the Y direction. Further, the R sub-pixel is adjacent to the W sub-pixel in the X direction, and adjacent to the G sub-pixel in the Y direction. Further, the B sub-pixel is adjacent to the W sub-pixel in the Y direction, and adjacent to the G sub-pixel in the X direction.

The W sub-pixel is a sub-pixel corresponding to white display, and varies the transmission state of the light in accordance with the image signal corresponding to the white display. Similarly, the R, G, and B sub-pixels are sub-pixels corresponding respectively to red display, green display, and blue display, and are driven by drive circuits of the image signals corresponding to the display of the respective colors to thereby vary the transmission state of the light.

Hereinafter, it is assumed that the sub-pixels and the image signals corresponding to the respective colors are distinguished by additionally describing the corresponding colors such as the sub-pixel corresponding to the white display referred to as a "sub-pixel W," or the image signal for displaying the sub-pixel W referred to as a "W signal." Here, the sub-pixel W corresponds to a first sub-pixel, and the sub-pixel G corresponds to a second sub-pixel. Further, the sub-pixel R corresponds to a third sub-pixel, and the sub-pixel B corresponds to a fourth sub-pixel.

The image processing device 100 obtains the image data from the external device, then converts it to the image data suitable for display in the projector 200, and then supplies it thereto. Specifically, the image processing device 100 generates the image data including the image signals of the four colors of R, G, B, and W from the image data including the image signals of the three colors of R, G, and B, and then supplies it to the projector 200.

In more detail, the image processing device 100 is provided with an input section 110, an image processing section 120, and an output section 130. The input section 110 obtains the image data including the image signals of the three colors of R, G, and B from the external device, and then input it to the image processing section 120. The image processing section 120 performs the image processing described later on the image signals to thereby generate the image signals of the four colors of R, G, B, and W, and then supplies them to the output section 130 as the image data. The output section 130 supplies the projector 200 with the image data generated by the image processing section 120.

Figure 3:
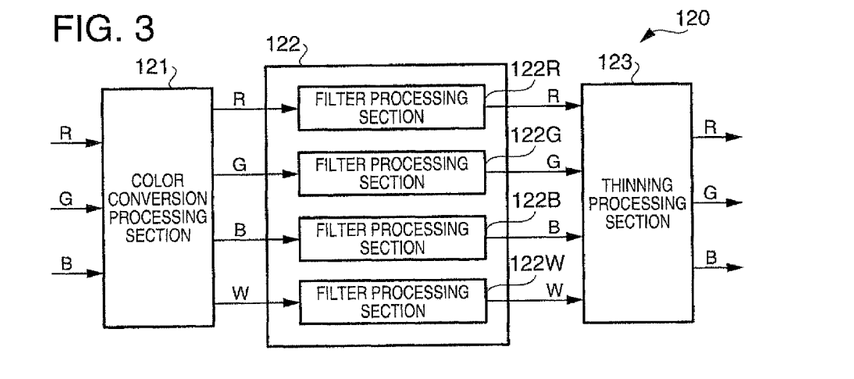
FIG. 3 is a block diagram showing a configuration of an image processing section.

FIG. 3 is a block diagram showing a configuration of the image processing section 120. As shown in the drawing, the image processing section 120 is provided with a color conversion processing section 121, a filter processing section 122, and a thinning processing section 123. Further, in more detail, the filter processing section 122 is configured including a filter processing section 122R, a filter processing section 122G, a filter processing section 122B, and a filter processing section 122W.

The color conversion processing section 121 converts the image signals of the three colors of R, G, and B into the image signals of the four colors of R, G, B, and W. The color conversion processing section 121 is capable of converting the image signals using a well-known method (e.g., the method disclosed in Document 3). The image signals are each, for example, 8-bit data expressing the luminance (i.e., the brightness) with 256 grayscale levels, but the number of grayscale levels is not limited thereto.

The filter processing section 122 performs the filter process on each of the image signals of the four colors of R, G, B, and W. In more detail, the filter processing section 122 includes the filter processing sections 122R, 122G, 122B, and 122W. The filter processing sections 122R, 122G, 122B, and 122W perform the filter processes respectively on the image signals corresponding to the reference symbols. For example, the filter processing section 122R performs the filter process on the R signal. The filter processing section 122W corresponds to a first filter processing section, and the filter processing section 122G corresponds to a second filter processing section. Further, the filter processing section 122R corresponds to a third filter processing section, and the filter processing section 122B corresponds to a fourth filter processing section.

The filter processing section 122 performs the filter process on a luminance-linear signal (a signal having a value the variation in which is linear with respect to the actual luminance variation). If the image signal input thereto is not a luminance-linear signal, the filter processing section 122 converts the image signal into a luminance-linear signal, then performs the filter process thereon, and then performs the reverse conversion after the filter process to thereby restore the gamma value. For example, in the case in which the color space of the image signal is defined by sRGB, since the gamma value is "2.2," the image signal is not a luminance-linear signal. In this case, the filter processing section 122 performs the gamma conversion so that the gamma value of the image signal changes from "2.2" to "1.0," and then performs the gamma conversion again on the image signal, on which the filter process has been performed, so that the gamma value changes from "1.0" to "2.2."

The thinning processing section 123 performs a thinning process for reducing the number of pixels of the image signal of each of the colors the band of which is limited by the filter processing section 122. The thinning processing section 123 reduces the number of pixels of the image signal of each of the colors to a quarter in each of the X direction and the Y direction. In other words, the thinning processing section 123 converts the image data of 4M×4N pixels per frame into the image data of M×N pixels. It should be noted that the image data after the conversion by the thinning processing section 123 is the data in which each pixel is composed of four sub-pixels. In other words, in comparison between the number of pixels of the image data before the conversion and the total number of the sub-pixels of the image data after the conversion, the former is four times (twice in the X direction and twice in the Y direction) as many as the latter.

The configuration of the display system 10 is as described above. Under the configuration, the display system 10 converts the image data having the 4M×4N pixels of the three colors (RGB) into the image data having the M×N pixels of the four colors (RGBW) with the image processing device 100, and then displays the image corresponding to the image data on the screen 300 with the projector 200. On this occasion, the filter processing section 122 performs the filter process based on the configuration of the liquid crystal panel 220 in the projector 200.

The filter processes performed by the filter processing sections 122R, 122G, 122B, and 122W are determined by the arrangement of the sub-pixels. Specifically, the filter process of each of the colors is for limiting the frequency bands in the X direction and the Y direction, respectively, in a manner corresponding to the intervals of the sub-pixels of the corresponding color in the respective directions, and then setting the gain to 0 in the band to be restricted. It should be noted that the frequency mentioned here denotes the spatial frequency of the image. In particular, the filter processes in the present embodiment are characterized in the point that it is used that the display by the sub-pixels W (i.e., the white display) includes the color components of the respective colors of RGB.

Figure 4:
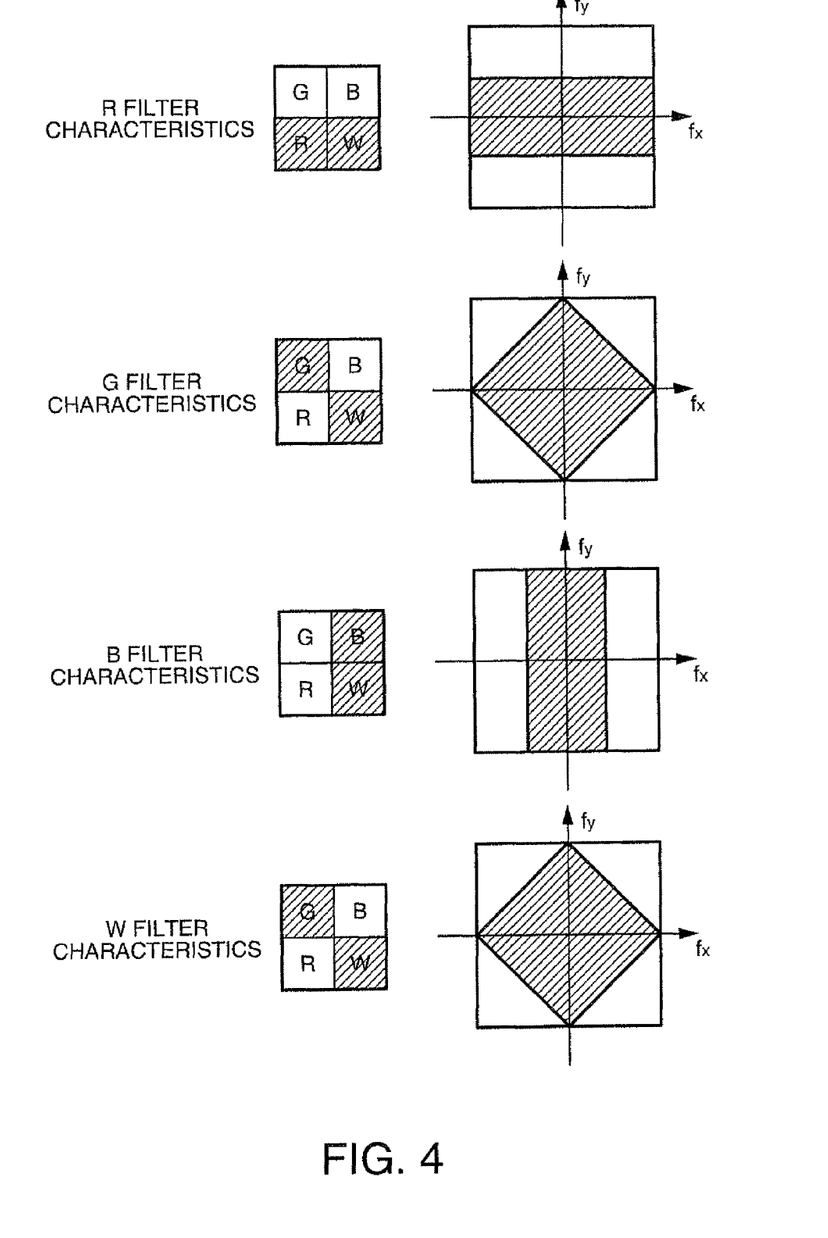
FIG. 4 is a diagram showing the characteristics of filters of respective colors.
Figure 5:
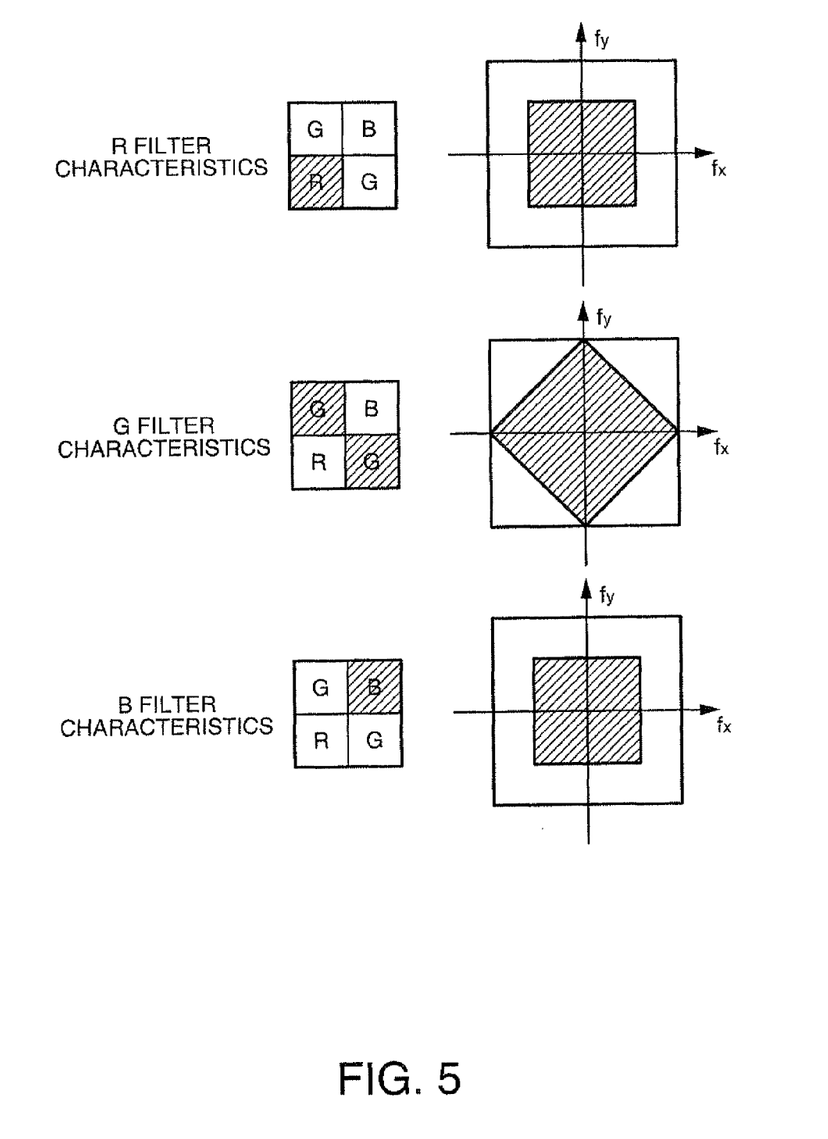
FIG. 5 is a diagram showing the characteristics of filters shown as a comparative example.
Figure 6:
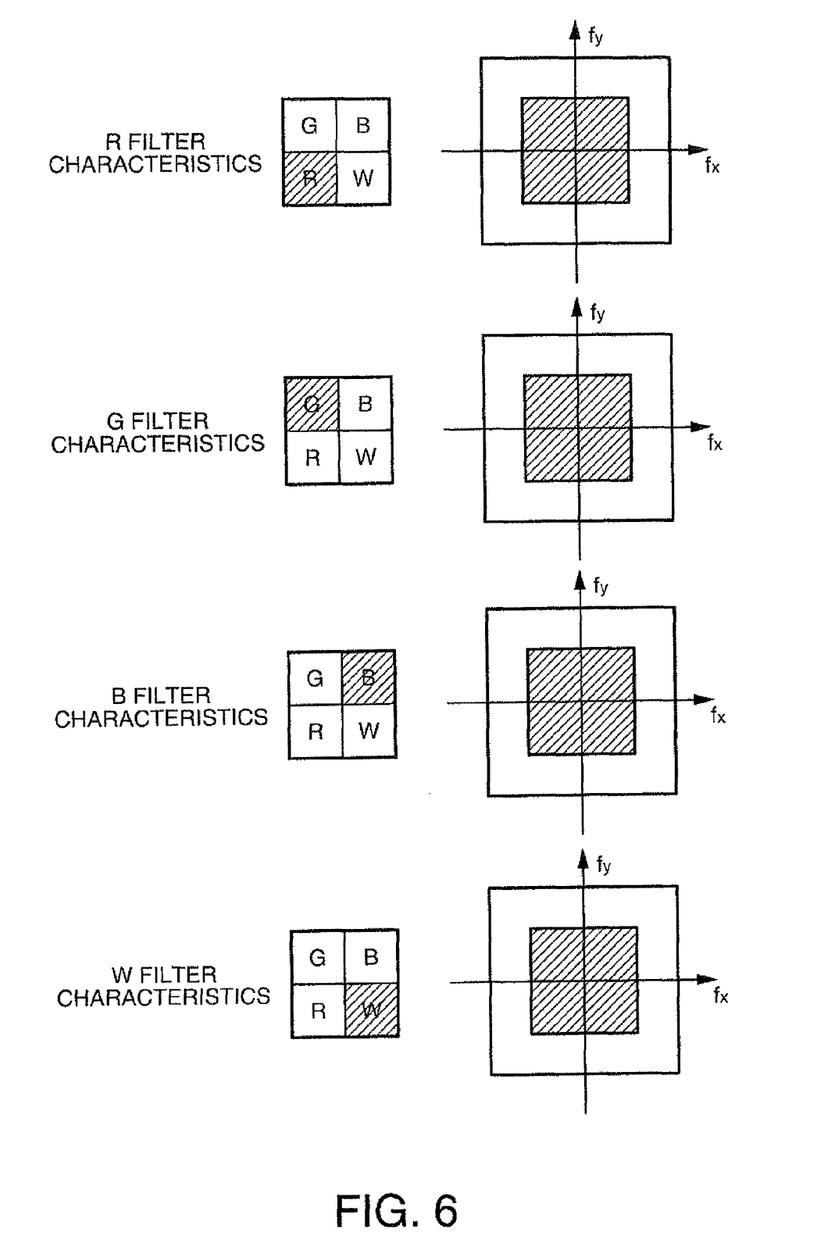
FIG. 6 is a diagram showing the characteristics of filters shown as a comparative example.

FIG. 4 is a diagram showing the characteristics of the filters of the respective colors in the present embodiment. Further, FIGS. 5 and 6 show the characteristics of the filters shown as comparative examples of the present embodiment, wherein FIG. 5 shows the characteristics of typical filters assumed in the Bayer arrangement (what is obtained by replacing the sub-pixel W in the present embodiment with the sub-pixel G), and FIG. 6 shows the characteristics of other filters in the case of using the sub-pixels having the same arrangement as in the present embodiment. It should be noted that in the drawings the horizontal axis ($f_x$) represents the frequency in the X direction, and the vertical axis ($f_y$) represents the frequency in the Y direction. Further, in the drawings, the squares indicated by the solid lines each represent the frequency band of the image signal input thereto, and the areas indicated by the hatching each represent the passband of the filter.

As shown in FIG. 5, in the Bayer arrangement, it is common that the both bands in the X direction and the Y direction are limited to a half on the low frequency side regarding the sub-pixel R and the sub-pixel B. This is because both of the sub-pixels R and the sub-pixels B are disposed every other cell in both of the X direction and the Y direction, and therefore, can only display the image at half the resolution of the image signal input thereto. In contrast, since the two sub-pixels G exist in each of the pixels, the filter with respect to the sub-pixel G can reduce the band to be restricted to half of those of the sub-pixel R and the sub-pixel B. Specifically, the filter applied to the G signal is configured so as to cut the area where both of the frequencies in the X direction and the Y direction are high.

Figure 7:
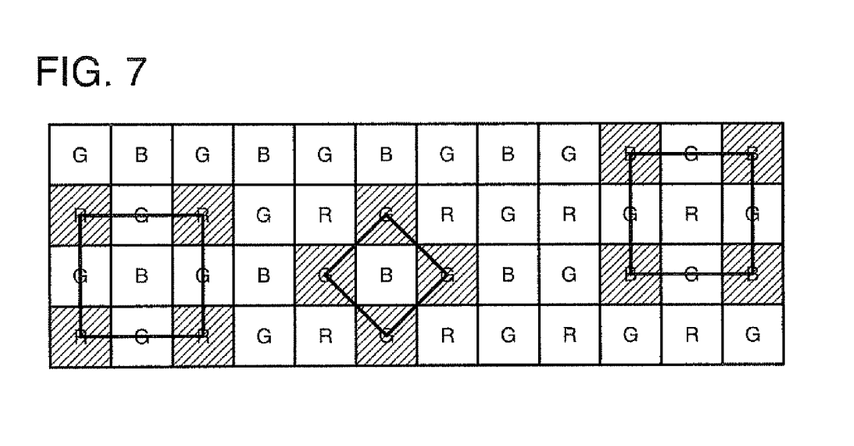
FIG. 7 is a diagram showing a grid formed by sub-pixels in the Bayer arrangement.

FIG. 7 is a diagram showing a grid formed by the sub-pixels in the Bayer arrangement. As shown in the drawing, the grid composed of the sub-pixels G is a square having a side shorter than that of the grid composed of the sub-pixels R (or the sub-pixels B), and has a shape tilted 45° with respect to the grid composed of the sub-pixels R (or the sub-pixels B). Further, when comparing the length of the side of each of the grids between the case of the sub-pixels G and the case of the sub-pixels R (or the sub-pixels B), the former is $\sqrt{2}/2$ (the value obtained by dividing the square root of 2 by 2) times of the latter. Therefore, in the Bayer arrangement, higher resolution display can be performed with the G signal, and it is possible to make the passband of the G signal broader than the passband of the R signal or the B signal.

On the other hand, in the present embodiment, as shown in FIG. 4, it is assumed that the filters applied to the G signal and the W signal are the same as the filter applied to the G signal in the Bayer arrangement shown in FIG. 7. The reason of performing such band limitation is that the display by the sub-pixels W includes the G component. In the present embodiment, the sub-pixels W are assumed to be the sub-pixels G, and the filter to be applied to the G signal and the W signal is determined.

Similarly, the display by the sub-pixels W also includes the R component and the B component. In the present embodiment, the characteristics of the filters applied to the R signal and the B signal are also determined using this fact. Specifically, in the case of assuming the sub-pixels W to be the sub-pixels R, it results that the sub-pixels R are disposed in the X direction tightly (without intervention of other sub-pixels), and it is possible to reproduce the image at substantially the same resolution as the image signal input thereto, and therefore, the filter is configured so as not to limit the band in the X direction. On the other hand, even in the case of assuming the sub-pixels W as the sub-pixels R, the sub-pixels R are disposed every other cell in the Y direction, the band in this direction is limited similarly to the case shown in FIG. 5.

It should be noted that the arrangement of the sub-pixels B in the case of assuming the sub-pixels W as the sub-pixels B is substantially the same as the arrangement obtained by rotating 90° the arrangement of the sub-pixels R in the case of assuming the sub-pixels W as the sub-pixels R. Therefore, the filter applied to the B signal in the present embodiment has the characteristics obtained by interchanging the X direction and the Y direction of the filter characteristics applied to the R signal.

As described above, the filters of the respective colors in the present embodiment limit only the band in the Y direction in a manner corresponding to the intervals of the sub-pixels R with respect to the R signal, and limit only the band in the X direction in a manner corresponding to the intervals of the sub-pixels B with respect to the B signal. Further, the filters corresponding to the G signal and the W signal limit the bands of the respective signals in a manner corresponding to the arrangement of the sub-pixels in the case of identifying and combining the sub-pixels G and the sub-pixels W with each other. In other wards, in the present embodiment, it is arranged that the broader frequency band of the image signals of the respective colors can be obtained compared to the case of the comparative examples shown in FIGS. 5 and 6 using the fact that the sub-pixels W share the components having the common optical characteristics with any one of the sub-pixels R, the sub-pixels G, and the sub-pixels B.

Compared to the filters shown in FIG. 6, the filters of the present embodiment have the difference in the restriction width of the band. Specifically, by assuming the sub-pixels W as the sub-pixels R or the sub-pixels B, the limitation in either one of the X direction and the Y direction becomes unnecessary in the R signal and the B signal, and therefore, the width of the passband is doubled. Further, regarding the G signal and the W signal, by assuming the sub-pixels W as the sub-pixels G, it becomes unnecessary to treat the sub-pixels W and the sub-pixels G as sub-pixels different from each other, and therefore, substantially the same band limitation as in the case of the Bayer arrangement shown in FIG. 5 can be adopted.

Therefore, according to the display system 10 of the present embodiment, it is possible to reduce the restriction width of the band compared to the case of providing the band limitations independently (i.e., without regard to the positions of the sub-pixels with different colors) to the image signals of the respective colors, and to improve the luminance of the image projected compared to the case of using the sub-pixels G instead of the sub-pixels W. Therefore, according to the display system 10, it is possible to improve the visual image quality compared to the case of any of the comparative examples shown in FIGS. 5 and 6.

Second Embodiment

The present embodiment shares the common configuration with the first embodiment described above except the point that the filter processes to the image signals are different. Therefore, in the present embodiment, the constituents common to the present embodiment and the first embodiment will be denoted by the symbols used in the first embodiment, and the duplicated explanation will be omitted if appropriate.

The present embodiment is for improving the so-called fineness of the image by suppressing the moire or the false color potentially generated in the configuration of the first embodiment to thereby further improve the visual image quality. The principle of generating the moire and the false color in the configuration of the first embodiment is specifically as follows.

The R signal and the B signal on which the filter processes have been performed have a difference from the W signal in frequency band included as the information such as omission of the information of the frequency band not restricted in the W signal or inclusion of the information of the frequency band restricted in the W signal. The information of the frequency band included in the W signal but not included in the R signal or the B signal can also be called superfluous information. Such information has the frequency band exceeding the Nyquist frequency (a half of the sampling frequency), and therefore, forms the alias and causes the moire. Here, the sampling frequency is determined based on the size of one pixel of the image signal input thereto. It should be noted that the G signal on which the filter process has been performed has the frequency band included as the information substantially the same as the frequency band of the W signal, and therefore, does not cause the moire.

Further, in the configuration of the first embodiment, such a moire is caused only in the R or B color component. Therefore, the moire caused in the configuration of the first embodiment is a colored moire. Therefore, in the case of intending to display the image including in particular a high-frequency component in the configuration of the first embodiment, the color different from the color originally existing in the image, namely the false color, is generated in a so-called edge (contour) portion.

Figure 8:
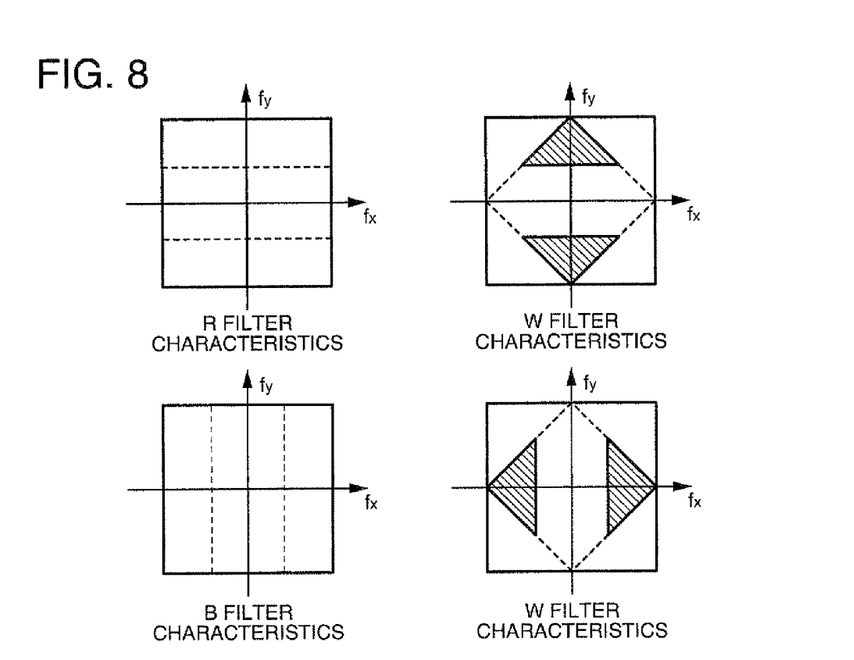
FIG. 8 is a diagram for explaining a frequency band causing the moire.

FIG. 8 is a diagram for explaining the frequency band causing the moire. It should be noted that in the drawing the bands, which are not restricted in the W signal but are restricted in the R signal or the B signal, are indicated by hatching, and the passbands (see FIG. 4) of the filters are indicated by the broken lines.

As shown in FIG. 8, in comparison between the characteristics of the R filter and the characteristics of the W filter, the band allowing the W signal to pass but blocking the R signal exists on the high-frequency side (specifically the high-frequency side higher than the center of the frequency band of the image signal input thereto) in the Y direction. On the other hand, in comparison between the characteristics of the B filter and the characteristics of the W filter, the band allowing the W signal to pass but blocking the B signal exists on the high-frequency side in the X direction.

Therefore, in the present embodiment, in at least one (preferably the both) the R and B filters, the frequency response is adjusted so as to cancel out the influences of such bands. Specifically, the filter processing sections 122R and 122B perform the filter processes so as to invert the phase of the band other than its own passband and included in the passband of the filter processing section 122W to thereby cancel the influence of the W signal. It should be noted that "canceling out" mentioned here not only denotes canceling out each other completely, but also denotes that one reduces the influence of the other.

Figure 9:
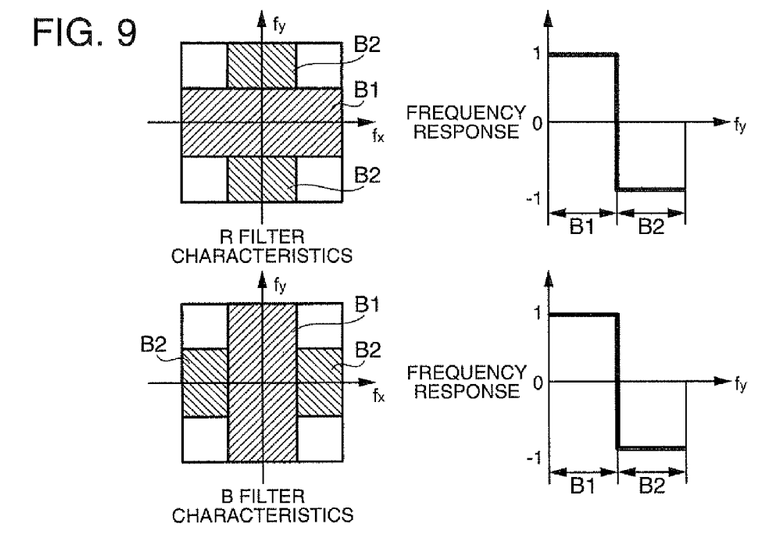
FIG. 9 is a diagram for explaining R and B filters and the frequency characteristics thereof.

FIG. 9 is a diagram for explaining R and B filters of the present embodiment and the frequency characteristics thereof. In each of the R and B filters of the present embodiment, the pass band B1 and the phase-inversion band B2 are set. The passband B1 is the band of allowing the image signal to pass, and is the same as in the first embodiment. On the other hand, the phase-inversion band B2 is a band in which the phase of the image signal is inverted and then allowed to pass, and is determined in accordance with the characteristics of the W filter. Specifically, the phase-inversion band B2 corresponds to a half of the frequency band of the image signal input therein on the high-frequency side thereof, and includes at least the passband of the filter processing section 122W. The passband 31 corresponds to a first band, and the phase-inversion band B2 corresponds to a second band.

In the case of the R signal, the phase-inversion band B2 is located on the high-frequency side of the frequency band in the Y direction. On the other hand, in the case of the B signal, the phase-inversion band B2 is located on the high-frequency side of the frequency band in the X direction. Therefore, the R and B filters in the present embodiment also have a relationship of interchanging the X direction and the Y direction similarly to the first embodiment. Further, the frequency response in the passband B1 is "1," while the frequency response in the phase-inversion band B2 is "−1" in the example shown in FIG. 9. The negative frequency response denotes that the image signal is output with the phase thereof in the phase-inversion band B2 inverted.

According to the filter process of the present embodiment, the colored moire and the false color can be suppressed. Further, the effect of suppressing the moire and the false color is more conspicuous in an achromatic image rather than in a chromatic image (in terms of the human vision, it can be said that the chromatic false color caused in an achromatic image is easier to sense than the chromatic false color caused in a chromatic image).

It should be noted that all of the moire and the false colors generated are not necessarily sensed by the human eye. Therefore, it can be said that the filter processes performed by the filter processing sections 122R and 122B exert a certain effect providing the influence of the W signal can be expressed to the extent that it is not possible (or difficult) for the human to visually recognize the influence. Therefore, the frequency response in the case in which the filter processing sections 122R and 122B invert the phase is sufficiently a negative, and is not necessarily required to be "−1."

Further, it is sufficient for the phase-inversion band B2 to include the passband of the filter processing section 122W, and is therefore not necessarily limited to the band shown in FIG. 9.

Figure 10:
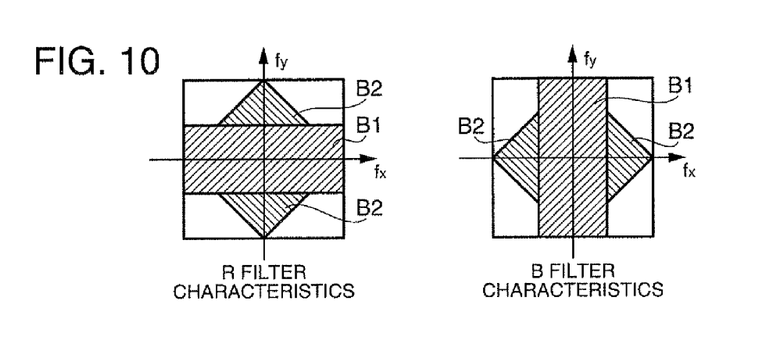
FIG. 10 is a diagram for exemplifying R and B filters.
Figure 11A:
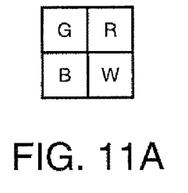
FIGS. 11A through 11D are diagrams for exemplifying the arrangement of the sub-pixels.
Figure 11B:
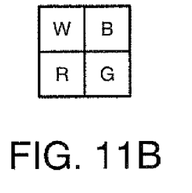
Figure 11C:
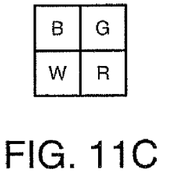
Figure 11D:
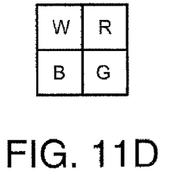

FIG. 10 is a diagram showing another example of the R and B filters of the present embodiment. Although the filters shown in the drawing have the phase-inversion band B2 smaller than that of the filters shown in FIG. 9, since the band includes the passband of the filter processing section 122W, the effect of suppressing the moire and the false color is exerted.

MODIFIED EXAMPLES

The invention is not limited to the embodiments described above, but can be put into practice in a variety of forms exemplified below. It should be noted that the modified examples shown below can also be combined arbitrarily with each other if necessary.

1. The arrangement of the pixels according to the invention is not necessarily required to have the square shape as in the embodiments described above. For example, if the sub-pixels have a rectangular shape, the arrangement of the overall pixels also has a rectangular shape. Further, the first direction and the second direction are not necessarily required to have the orthogonal relationship, but sufficiently have an intersectional relationship. Specifically, any pixels can be adopted in the invention without regard to the specific shape thereof providing the pixels are each composed of four sub-pixels arranged 2×2 forming a quadrilateral shape.

Further, the positional relationship of the sub-pixels in each of the pixels is not limited to those of the embodiments described above. In the pixels according to the invention, the sub-pixels adjacent to each other can be different from those of the embodiments providing the sub-pixel (the sub-pixel G in the embodiments) on which the substantially the same band limitation as in the sub-pixel W is performed is located in the diagonal direction viewed from the sub-pixel W.

FIGS. 11A through 11D are diagrams showing other examples of the arrangement of the sub-pixels. The arrangement shown in FIG. 11A can be obtained by interchanging the positions of the sub-pixel R and the sub-pixel B in the arrangement of the embodiment (see FIG. 2) described above. In this case, it is sufficient to make the filter process to the R signal substantially the same as the filter process performed on the B signal in the embodiments, and make the filter process to the B signal substantially the same as the filter process performed on the R signal in the embodiments. Further, the arrangement shown in FIG. 11B can be obtained by interchanging the positions of the sub-pixel G and the sub-pixel W in the arrangement of the embodiment described above. In this case, the filter processes to the image signals of the respective colors are substantially the same as those in the embodiments. In addition, the arrangement of the sub-pixels can also be the arrangement obtained by rotating each of the arrangements around the point of symmetry or the lines of symmetry as the examples shown in FIGS. 11C and 11D.

Further, in some cases, in the positional relationship between the sub-pixels of the respective colors in the arrangement of the sub-pixels, the sub-pixel W and the sub-pixel G are not necessarily required to be opposed to each other in the diagonal direction. For example, in the case of displaying a reddish image or an image containing a high proportion of red, or in the case of intending to display red in a more eye-friendly manner than other colors, it is possible to set the sub-pixel R to the sub-pixel opposed to the sub-pixel W in the diagonal direction. In other words, it is possible to determine the arrangement of the sub-pixels taking the image to be displayed by the display device or the image quality required to the display device into consideration.

2. In the embodiments described above, there is described an example of fulfilling the relationship of $Y_W = Y_R + Y_G + Y_B$. However, in some cases, the actual liquid crystal panel does not necessarily fulfill such a relationship, and $Y_W$ is not equal to the sum of $Y_R$, $Y_G$, and $Y_B$. In such cases, when inverting the phase by the filter process to the R signal or the B signal, it is also possible to determine the frequency response in the phase-inversion band B2 in accordance with the actual luminance of the sub-pixel to thereby achieve a balance with the luminance of the sub-pixels of the respective colors. In other words, the filter process by the filter processing section 122 can be determined based on the characteristics of the liquid crystal panel 220 used actually. Therefore, the filter processing section 122 can be configured so that the user can adjust the characteristics of the filters taking the characteristics of the liquid crystal panel 220 into consideration.

3. The invention is not required to have the light modulator composed of the transmissive pixels as in the embodiments described above, but can be applied to the display panels having light emitting pixels such as an organic electroluminescence (EL) display or a plasma display providing substantially the same pixel arrangement as in the embodiments described above is provided. Therefore, the display device according to the invention is not limited to the projector. Further, in the case in which the light modulator is a liquid crystal panel, the panel is not limited to the transmissive type, but the reflective type can also be adopted.

Further, the image processing device according to the invention can be realized by an image processing circuit incorporated in the display device, or can be realized by a software process performed by a computer device such as a personal computer. Further, the invention can also be provided in the form of an image processing method of performing the image processing corresponding to each of the four colors, a program for making the computer device perform the image processing, and a recording medium on which the program is recorded.

The entire disclosure of Japanese Patent Application No. 2011-160723, filed Jul. 22, 2011 is expressly incorporated by reference herein.

What is claimed is:

1. An image processing device adapted to supply an image signal to a display device having pixels arranged in a matrix, each of the pixels being composed mainly of four sub-pixels arranged two by two in a first direction and a second direction intersecting with the first direction, one of the sub-pixels constituting each of the pixels corresponding to white, the image processing device comprising:
   a first filter processing section adapted to perform a filter process of limiting frequency bands in the first direction and the second direction of a first image signal according to an arrangement of a first sub-pixel and a second sub-pixel located in a diagonal direction with respect to the first sub-pixel, the first image signal adapted to display the first sub-pixel corresponding to white;
   a second filter processing section adapted to perform a same filter process as the first filter processing section of limiting frequency bands in the first direction and the second direction of a second image signal according to an arrangement of the first sub-pixel and the second sub-pixel, the second image signal adapted to display the second sub-pixel;
   a third filter processing section adapted to perform a filter process of limiting a frequency band in only the second direction of a third image signal according to an interval in the second direction of third sub-pixels, the third image signal adapted to display the third sub-pixels which are adjacent to the first sub-pixels in the first direction; and
   a fourth filter processing section adapted to perform a filter process of limiting a frequency band in only the first direction of a fourth image signal according to an interval in the first direction of the fourth sub-pixels, the fourth image signal adapted to display the fourth sub-pixels which are adjacent to the first sub-pixels in the second direction.

2. The image processing device according to claim 1, wherein
   at least one of the third filter processing section and the fourth filter processing section allows
   the image signal, which is input, in a band other than a passband of the at least one of the third filter processing section and the fourth filter processing section, and included in a passband of the first filter processing section to pass with a phase of the image signal inverted.

3. The image processing device according to claim 2, wherein
   a frequency response in the band the image signal passes with the phase inverted is determined in accordance with luminance of the first sub-pixel, the second sub-pixel, the third sub-pixel, and the fourth sub-pixel.

4. A display device comprising:
   a display panel having a plurality of pixels arranged in a matrix, each of the pixels being mainly composed of the first sub-pixel, the second sub-pixel, the third sub-pixel, and the fourth sub-pixel; and
   the image processing device according to claim 3.

5. A display device comprising:
   a display panel having a plurality of pixels arranged in a matrix, each of the pixels being mainly composed of the first sub-pixel, the second sub-pixel, the third sub-pixel, and the fourth sub-pixel; and
   the image processing device according to claim 2.

6. The image processing device according to claim 1, wherein
the second filter processing section performs the filter process on the image signal corresponding to green, and
the third filter processing section and the fourth filter processing section perform the filter processes on the image signals corresponding to red and blue, respectively.

7. A display device comprising:
a display panel having a plurality of pixels arranged in a matrix, each of the pixels being mainly composed of the first sub-pixel, the second sub-pixel, the third sub-pixel, and the fourth sub-pixel; and
the image processing device according to claim 6.

8. A display device comprising:
a display panel having a plurality of pixels arranged in a matrix, each of the pixels being mainly composed of the first sub-pixel, the second sub-pixel, the third sub-pixel, and the fourth sub-pixel; and
the image processing device according to claim 1.

9. An image processing method performed on an image signal supplied to a display device having pixels arranged in a matrix, each of the pixels being composed mainly of four sub-pixels arranged two by two in a first direction and a second direction intersecting with the first direction, one of the sub-pixels constituting each of the pixels corresponding to white, the method comprising:
limiting frequency bands in the first direction and the second direction of a first image signal according to an arrangement of both of a first sub-pixel and a second sub-pixel located in a diagonal direction with respect to the first sub-pixel, the first image signal adapted to display the first sub-pixel corresponding to white;
limiting frequency bands in the first direction and the second direction of a second image signal according to an arrangement of the first sub-pixel and the second sub-pixel, the second image signal adapted to display the second sub-pixel;
limiting a frequency band in only the second direction of a third image signal according to an interval in the second direction of the third sub-pixels, the third image signal adapted to display the third sub-pixels which are adjacent to the first sub-pixels in the first direction; and
limiting a frequency band in only the first direction of a fourth image signal according to an interval in the first direction of the fourth sub-pixels, the fourth image signal adapted to display the fourth sub-pixels which are adjacent to the first sub-pixels in the second direction.

* * * * *